(12) United States Patent
Katayama et al.

(10) Patent No.: US 8,677,036 B2
(45) Date of Patent: Mar. 18, 2014

(54) POWER CONTROL DEVICE

(75) Inventors: Shinichi Katayama, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 577 days.

(21) Appl. No.: 12/926,372

(22) Filed: Nov. 12, 2010

(65) Prior Publication Data

US 2011/0119516 A1    May 19, 2011

(30) Foreign Application Priority Data

Nov. 16, 2009   (JP) ................................. 2009-261285

(51) Int. Cl.
*G06F 13/12*     (2006.01)
*G06F 13/38*     (2006.01)

(52) U.S. Cl.
USPC .................................. 710/62; 710/65; 710/72

(58) Field of Classification Search
None
See application file for complete search history.

(56) References Cited

U.S. PATENT DOCUMENTS

| 6,016,519 | A * | 1/2000 | Chida et al. | 710/19 |
|---|---|---|---|---|
| 2003/0133263 | A1 * | 7/2003 | Shu | 361/685 |
| 2003/0167345 | A1 * | 9/2003 | Knight et al. | 709/249 |
| 2005/0154799 | A1 * | 7/2005 | Feng et al. | 710/1 |
| 2007/0293223 | A1 * | 12/2007 | Kuwana | 455/436 |
| 2010/0148584 | A1 * | 6/2010 | Yang et al. | 307/66 |

FOREIGN PATENT DOCUMENTS

| JP | 10-225011 | 8/1998 |
|---|---|---|
| JP | 2000-163164 | 6/2000 |
| JP | 2003-087418 | 3/2003 |
| JP | 2003-208245 | 7/2003 |
| JP | 2006-293734 | 10/2006 |
| JP | 2007-58396 | 3/2007 |

OTHER PUBLICATIONS

Japanese Office Action mailed Jul. 30, 2013 in corresponding Japanese Application No. 2009-261285.

* cited by examiner

*Primary Examiner* — Kris Rhu
(74) *Attorney, Agent, or Firm* — Staas & Halsey LLP

(57) ABSTRACT

A power control device coupled to a power supply device and an information processing device, and configured to control a power supply from the power supply device to the information processing device, the power control device including: a first input/output unit configured to input/output data from/to the information processing device; a second input/output unit configured to input/output data from/to the power supply device by a change of state of signal lines; a storage unit configured to store data input from the first input/output unit and the second input/output unit; and a control unit configured to execute a conversion process for converting data input from the first input/output unit to a change of state of a signal line that can be output from the second input/output unit, and converting a change of state of a signal line input from the second input/output unit to a data format that can be output from the first input/output unit.

8 Claims, 14 Drawing Sheets

| COMMUNI-CATION DEVICE FLAG | DIREC-TION | DATA |
|---|---|---|
| 3 | IN | STATE OF SIGNAL LINE (NOTIFICATION FROM UPS) |
| | OUT | STATE OF SIGNAL LINE (NOTIFICATION TO UPS) |
| 2 | IN | SERIAL DATA (INFORMATION FROM POWER CONTROL DEVICE) |
| | OUT | SERIAL DATA (SETTING CHANGE OF POWER CONTROL DEVICE) |
| 10 | IN | SERIAL DATA (INFORMATION FROM SERIAL DEVICE) |
| | OUT | SERIAL DATA (SETTING CHANGE OF SERIAL DEVICE) |

| SIGNAL LINE | DATA (BIT FLAG) | DIREC-TION | CONTENT OF NOTIFICATION TO/FROM UPS |
|---|---|---|---|
| DCD(CD) | 0x001 | IN | DECREASE IN BATTERY VOLTAGE |
| RXD(RD) | 0x002 | IN | UNUSED |
| TXD(SD) | 0x004 | OUT | NEGATIVE VOLTAGE |
| DTR(ER) | 0x008 | OUT | UPS STOPPAGE, NEGATIVE TO POSITIVE |
| GND(SG) | 0x200 | | SIGNAL EARTH |
| DSR(DR) | 0x010 | IN | POWER OUTAGE |
| RTS(RS) | 0x020 | OUT | POSITIVE VOLTAGE |
| CTS(CS) | 0x040 | IN | SIGNAL OF POWER FAILURE OCCURRENCE |
| CI(N.C.) | 0x080 | IN | UNUSED |
| FG(N.C.) | 0x100 | IN | UNUSED |

| DESTI-NATION | DATA |
|---|---|
| FIRST SERVER PC | POWER OFF WHEN FAILURE SUCH AS DECREASE IN BATTERY VOLTAGE OF FIRST UPS OCCURS |
| SECOND SERVER PC | POWER OFF WHEN FAILURE SUCH AS DECREASE IN BATTERY VOLTAGE OF SECOND UPS OCCURS |
| THIRD SERVER PC | POWER OFF WHEN FAILURE SUCH AS DECREASE IN BATTERY VOLTAGE OCCURS IN BOTH FIRST UPS AND SECOND UPS |
| FOURTH SERVER PC | POWER OFF WHEN FAILURE SUCH AS DECREASE IN BATTERY VOLTAGE OCCURS IN EITHER FIRST UPS OR SECOND UPS |

| COMMUNI-CATION DEVICE FLAG | DIREC-TION | DATA |
|---|---|---|
| 3 | IN | STATE OF SIGNAL LINE (NOTIFICATION FROM FIRST UPS) |
| | OUT | STATE OF SIGNAL LINE (NOTIFICATION TO FIRST UPS) |
| 4 | IN | STATE OF SIGNAL LINE (NOTIFICATION FROM SECOND UPS) |
| | OUT | STATE OF SIGNAL LINE (NOTIFICATION TO SECOND UPS) |
| 5 | IN | STATE OF SIGNAL LINE (NOTIFICATION OF RESULT OF AND OPERATION BETWEEN SIGNAL STATE OF FIRST UPS AND SIGNAL STATE OF SECOND UPS) |
| | OUT | STATE OF SIGNAL LINE (NOTIFICATION TO FIRST UPS) |
| 6 | IN | STATE OF SIGNAL LINE (NOTIFICATION OF RESULT OF OR OPERATION BETWEEN SIGNAL STATE OF FIRST UPS AND SIGNAL STATE OF SECOND UPS) |
| | OUT | STATE OF SIGNAL LINE (NOTIFICATION TO FIRST UPS) |

POWER CONTROL DEVICE

CROSS-REFERENCE TO RELATED APPLICATION

This application is based upon and claims the benefit of priority of the prior Japanese Patent Application No. 2009-261285, filed on Nov. 16, 2009, the entire contents of which are incorporated herein by reference.

FIELD

A certain aspect of the embodiments discussed herein is related to a power control device.

BACKGROUND

Recently, there has been developed of a power control device having a physical interface capable of intercommunication in addition to a power supply interface. For example, it is possible to configure a setting of a UPS (Uninterruptible Power Supply) or to notify a server of an occurrence of anomaly in a UPS by coupling the server PC with the UPS via above power control device (see Japanese Laid-Open Patent Application Publication No. 2000-163164).

A conventional power control device mainly aims to control a power supply from a UPS or the like to a device, and its communication function is limited. For example, when configuring the setting of the power control device from the server PC or when performing communication between a server PC and a device that are coupled to a common power control device, it is necessary to set up a communication environment separately. Consequently, an installation space and cost of a network become large. Moreover, when a server PC has only a single communication resource, the communication resource is occupied by communication with the power control device.

SUMMARY

According to an aspect of the present invention, there is provided a power control device coupled to a power supply device and an information processing device, and configured to control a power supply from the power supply device to the information processing device, the power control device including: a first input/output unit configured to input/output data from/to the information processing device; a second input/output unit configured to input/output data from/to the power supply device by a change of state of signal lines; a storage unit configured to store data input from the first input/output unit and the second input/output unit; and a control unit configured to execute a conversion process for converting data input from the first input/output unit to a change of state of a signal line that can be output from the second input/output unit, and converting a change of state of a signal line input from the second input/output unit to a data format that can be output from the first input/output unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given of an exemplary embodiment with reference to the accompanying drawings.

A description will be given of a power control device in accordance with a comparative example and a server system including the power control device.

COMPARATIVE EXAMPLE

Figure 1:
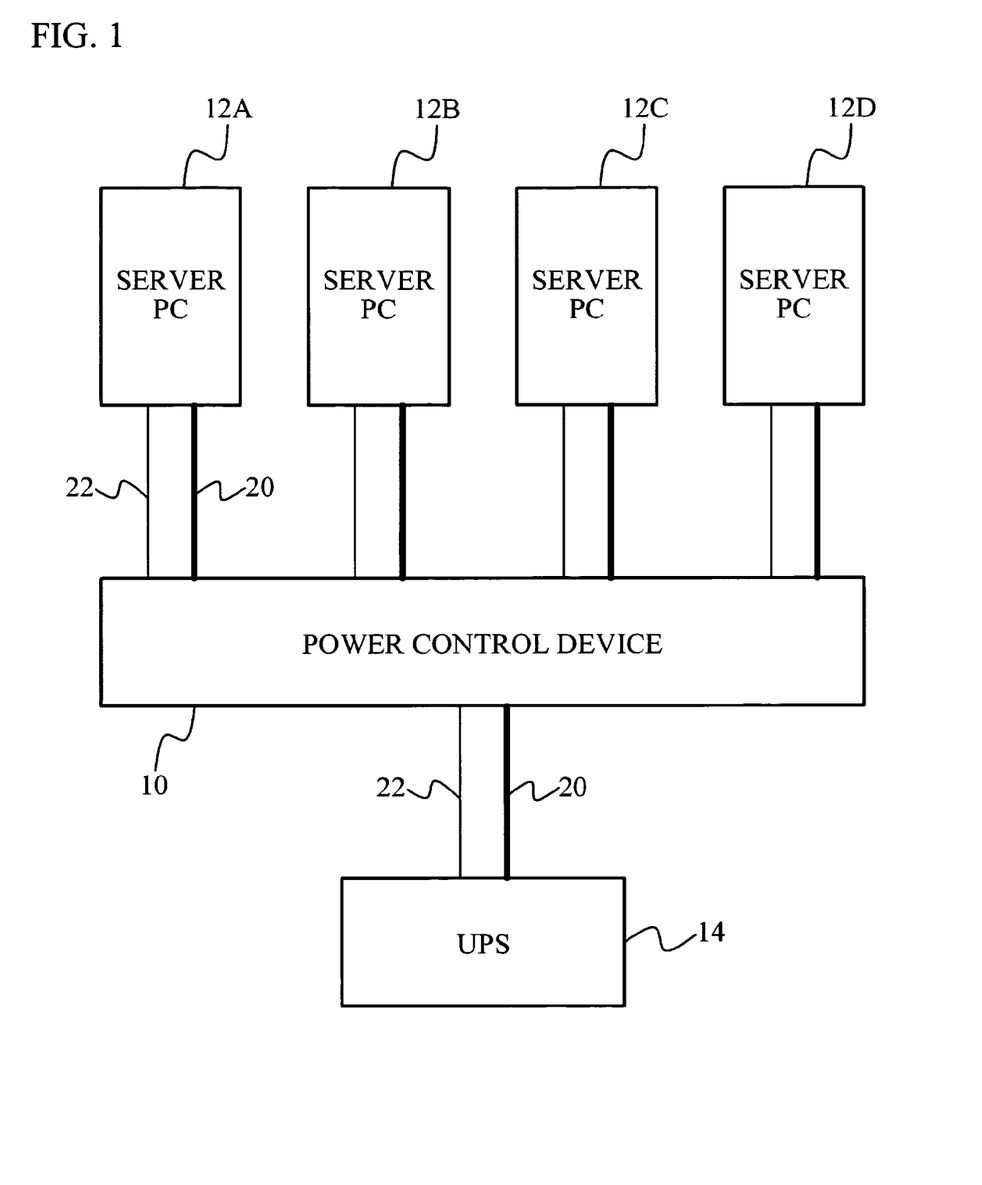
FIG. 1 is a diagram illustrating a composition of a server system in accordance with a comparative example.

FIG. 1 is a diagram illustrating a composition of a server system in accordance with a comparative example. A UPS 14 as a power supply device and server PCs 12A through 12D as information processing devices are coupled to a power control device 10 via power cables 20 and communication cables 22. Communication cables 22 are cables capable of serial communication (e.g. RS-232C), and coupled to the power control device 10, the UPS 14 and a serial port of each of server PCs 12.

The power control device 10 distributes electricity, which is supplied from the UPS 14, to server PCs 12A through 12D via power cables 20. The power control device 10 detects a decrease in battery voltage, a stoppage of operation, an occurrence of power failure and the like in the UPS 14 with a state of signal (H (High) or L (Low)) of a given pin in the RS-232C, and notifies server PCs 12 of them. According to this, the state control of the UPS 14 can be performed on server PCs 12 side.

In the above server system, it is necessary for the server PC 12 to have an unused serial port, and the power control device 10 can not be coupled to the server PC 12 when the server PC 12 does not have an unused serial port. When the power control device 10 is coupled to the server PC 12 in a case that the server PC 12 has only a single serial port, the server PC 12 cannot use other serial devices such as a modem.

In the above server system, when other serial devices are coupled to server PCs 12A through 12D, a device such as a serial console server for establishing an interface or a network environment for access is necessary separately, and it needs an installation space and a cost.

As the communication between the power control device 10 and the server PC 12 is used only as the communication to the UPS 14, it is not possible to perform a setting change of the power control device 10 and the like from the server PC 12 by using a communication resource.

As described above, in the server system in accordance with a comparative example, a communication function of the power control device 10 is limited. In the following embodiments, a description will be given of a power control device that improves a communication function.

[First Embodiment]

Figure 2:
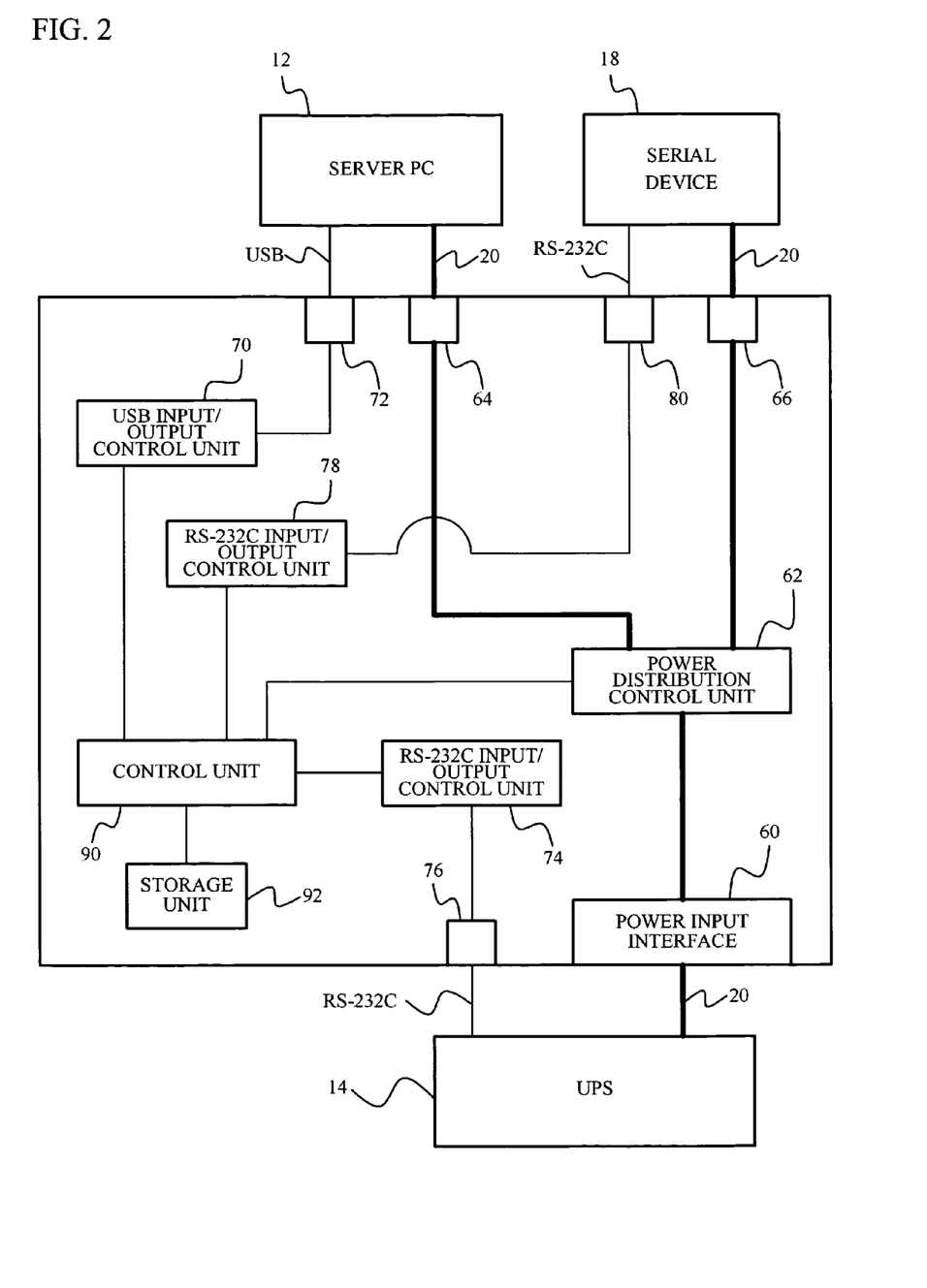
FIG. 2 is a diagram illustrating a composition of a server system and a detail composition of a power control device in accordance with a first embodiment.

FIG. 2 is a diagram illustrating a composition of a server system and a detail composition of a power control device in accordance with a first embodiment. Same reference numerals are used for common elements with the comparative example (FIG. 1), and a detail description is omitted. In drawings hereinafter, a heavy line indicates a line for power supply, and a narrow line indicates a line for data communication. The first embodiment differs from the comparative example in that a serial device 18 is coupled to the power control device 10 via the power cable 20 and the communication cable RS-232C. The power control device 10 is coupled to the server PC 12 by a USB cable, not by an RS-232C. One or multiple server PCs can be coupled to the power control device 10, but one server PC is illustrated in FIG. 2.

The power control device 10 is provided with a power input interface 60 capable of connecting to the power cable 20 from the UPS 14, a power distribution control unit 62 that has a power distribution function, and output terminals 64 and 66. A power cable from the server PC 12 is coupled to the output terminal 64 and a power cable from the serial device 18 is coupled to the output terminal 66. According to this, the power control device 10 can distribute the power, which is supplied from the UPS 14, to the server PC 12 and the serial device 18.

The power control device 10 includes a USB input/output control unit 70 and an input/output terminal 72 that function as a first input/output unit, an RS-232C input/output control unit 74 and an input/output terminal 76 that function as a second input/output unit, and an RS-232C input/output control unit 78 and an input/output terminal 80 that function as a third input/output unit. The power control device 10 further includes a control unit 90 and a storage unit 92.

Figure 3:
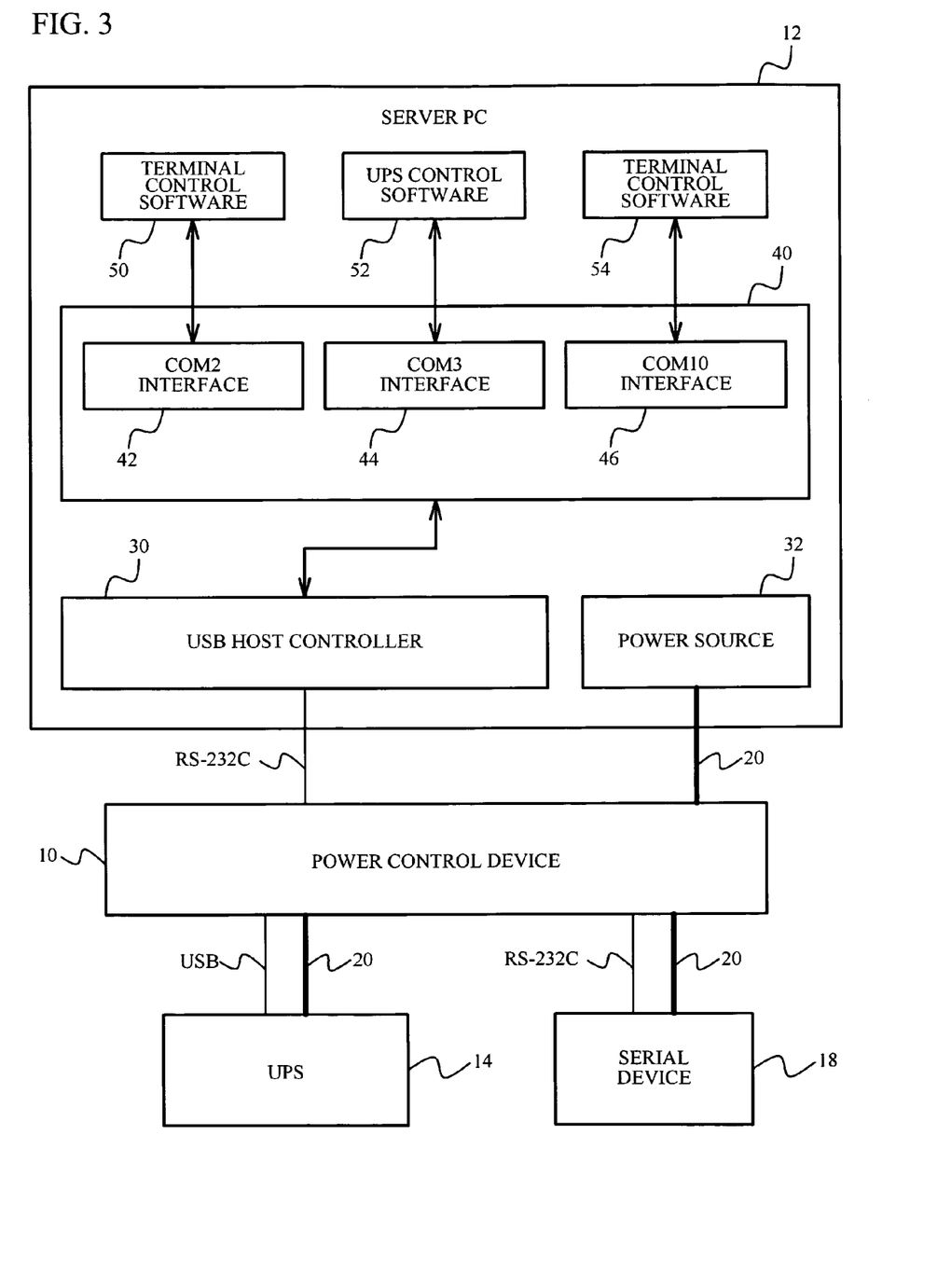
FIG. 3 is a diagram illustrating a detail composition of an information processing device illustrated in FIG. 2.

FIG. 3 is a diagram illustrating a detail composition of the server PC 12 illustrated in FIG. 2. The server PC 12 includes a USB host controller 30 coupled to a communication cable (USB), and a power source 32 coupled to the power cable 20. Various control softwares and drivers are installed to the server PC 12 by storing them to an internal storage device (not illustrated). A dedicated driver 40 has a COM-USB conversion function, and provides three COM interfaces as interface. More specifically, COM interfaces includes a COM2 interface 42 for communicating with the power control device 10, a COM3 interface 44 for communicating with the UPS 14, and a COM10 interface 46 for communicating with the serial device 18. Interfaces inside the dedicated driver 40 corresponds to a terminal control software which allows a user to operate, the COM2 interface 42 corresponds to a terminal control software 50, the COM3 interface 44 corresponds to a UPS control software 52, and the COM10 interface 46 corresponds to a terminal control software 54.

Figure 4:
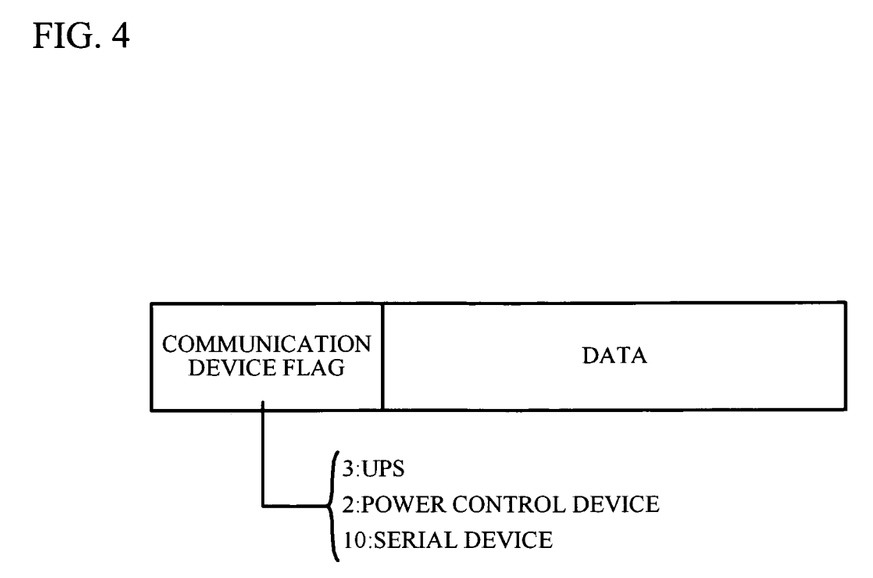
FIG. 4 is a diagram illustrating a format of data in the first embodiment.

FIG. 4 is a diagram illustrating a format of data which is transmitted and received between the server PC 12 and the power control device 10 by a USB interface. As illustrated, a communication device flag (hereinafter, referred to as a "communication flag") indicating a device for data communication is set to a data header. The communication flags "3", "2" and "10" indicate a UPS, a control device and a serial device respectively, which correspond to the COM interfaces 42, 44 and 46 inside the dedicated server 40 respectively. The communication flag is set by the dedicated driver 40 of the server PC 12 (at the time of data transmission from the server PC 12 to the power control device 10) or by the control unit 90 of the power control device 10 (at the time of data transmission from the power control device 10 to the server PC 12).

Figure 5:
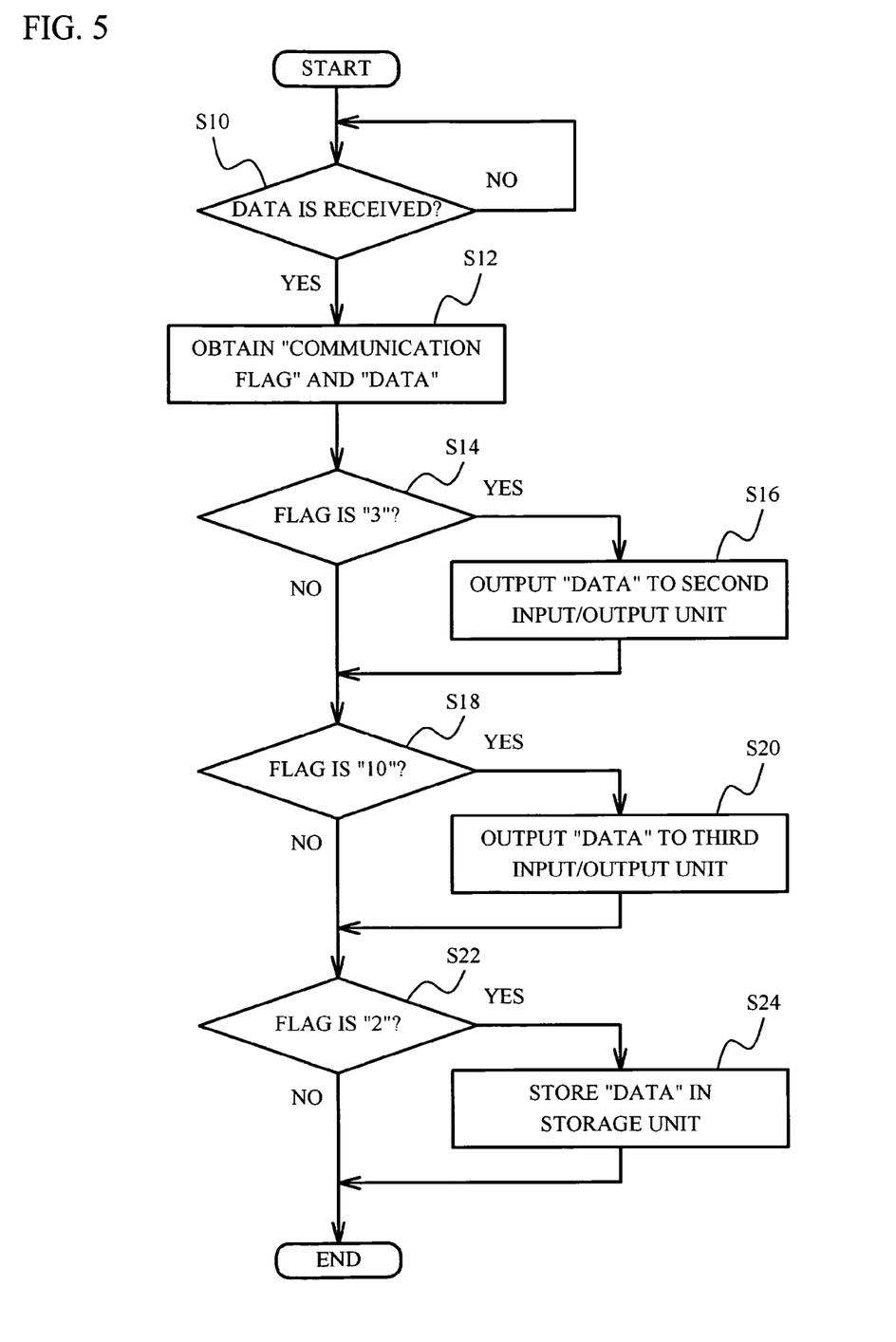
FIG. 5 is a first diagram illustrating a data processing in the first embodiment.

FIG. 5 is a first diagram illustrating a data processing in accordance with a first embodiment data. A description is given of a process in a case where data is input to the power control device 10 from the server PC 12. The control unit 90 of the power control device 10 determines whether data is received from the server PC 12 (step S10). When the data is received, the control unit 90 obtains "a communication flag" and "data" from received data (step S12). When the "communication flag" is "3" (step S14), the control unit 90 outputs "data" to the RS-232C input/output control unit 74 as the second input/output unit (step S16). When the "communication flag" is "10" (step S18), the control unit 90 outputs "data" to the RS-232C input/output control unit 78 as the third input/output unit (step S20). When the "communication flag" is "2" (step S22), the control unit 90 stores "data" in the storage unit 92 inside the power control device 10 (step S24). At this time, when the data is related to the setting change of the power control device 10 (described after), the control unit 90 changes the setting of itself depending on the content.

Figure 6:
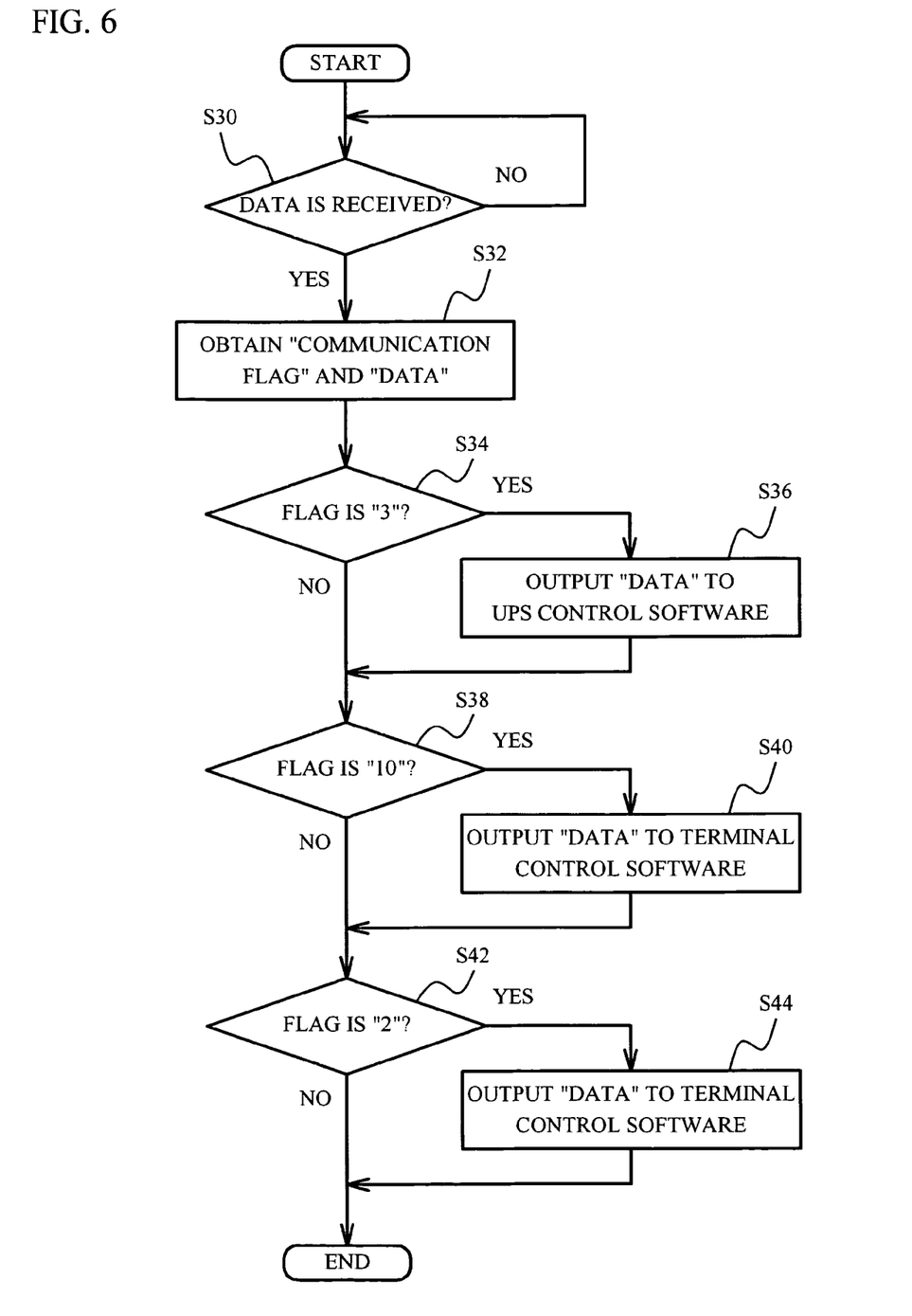
FIG. 6 is a second diagram illustrating the data processing in the first embodiment.

FIG. 6 is a second diagram illustrating a data processing in accordance with the first embodiment. A description is given of a process in a case where data is output to the server PC 12 from the power control device 10. The dedicated driver 40 of the server PC 12 determines whether data is received from the power control device 10 (step S30). When data is received, the dedicated driver 40 obtains a "communication flag" and "data" from the received data (step S32). When the "communication flag" is "3" (step S34), the dedicated driver 40 outputs "data" to the UPS control software 52 via the COM2 interface 42 (step S36). When the "communication flag" is "10" (step S38), the dedicated driver 40 outputs "data" to the terminal control software 54 via the COM10 interface 46 (step S40). When the "communication flag" is "2" (step S42), the dedicated driver 40 outputs "data" to the terminal control software 50 via the COM2 interface 42 (step S44).

Figure 7:
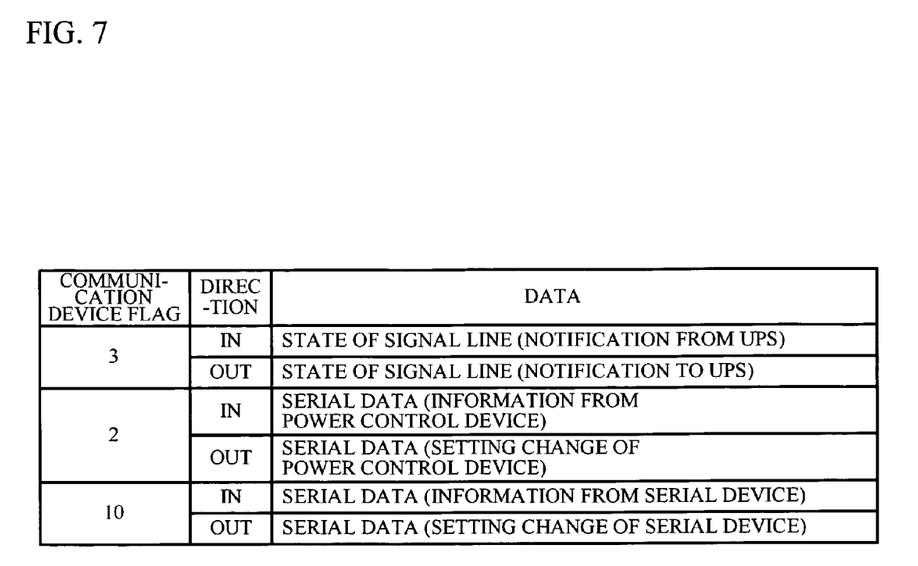
FIG. 7 is a diagram illustrating a specific structure of data in the first embodiment.

FIG. 7 is a diagram illustrating a specific structure of data. In addition to the format illustrated in FIG. 4, the direction of data input/output is provided. The direction of data "OUT" means a data reception process from the server PC 12 in the power control device 10 (FIG. 5). The direction of data "IN" means a data transmission process from the power control device 10 to the server PC 12 (FIG. 6).

In a case where the communication flag is "3", the content of data is a state of a signal line, is a notification from the UPS 14 when the direction of data is "IN", and is a notification to the UPS 14 when the direction of data is "OUT". In a case where the communication flag is "2", the content of data is serial data, is information from the power control device 10 when the direction of data is "IN", and is information (a setting change and the like) to the power control device 10 when the direction of data is "OUT". In a case where the communication flag is "10", the content of data is serial data, is information from the serial device 18 when the direction of data is "IN", and is information (a setting change and the like) to the serial device 18 when the direction of data is "OUT".

Figure 8:
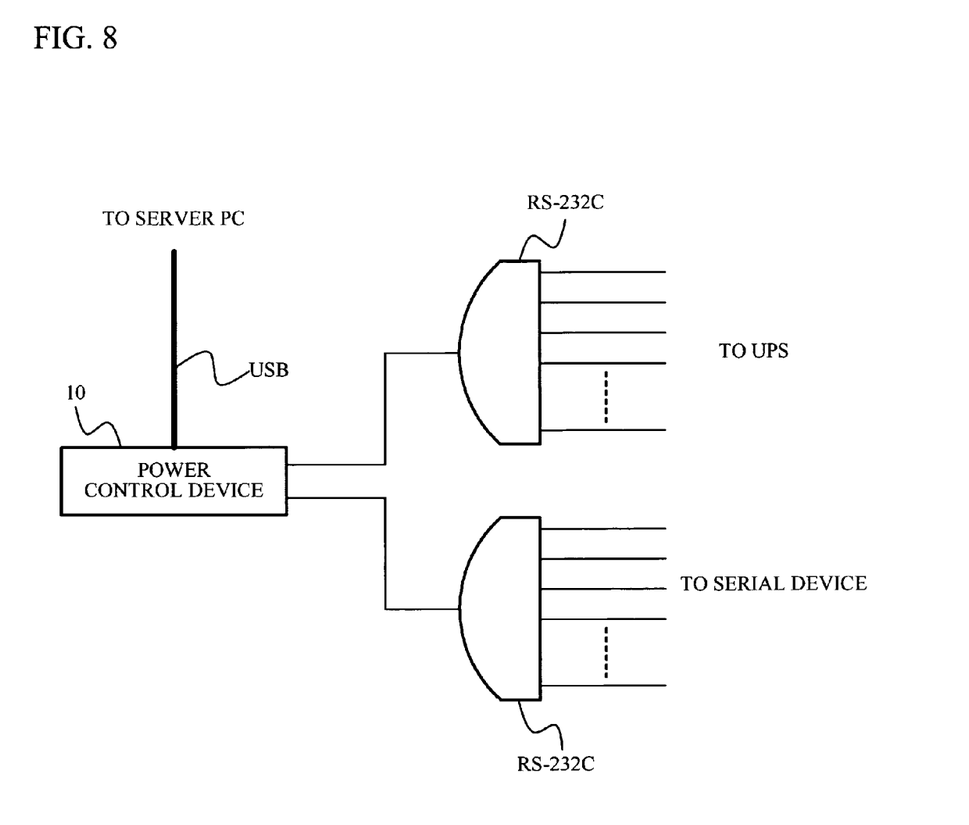
FIG. 8 is a diagram for explaining a communication format of data.

FIG. 8 is a diagram for explaining a communication format of data. As illustrated, a communication between the power control device 10 and the UPS 14 is performed by an RS-232C interface. RS-232C includes multiple signal lines (pins), and each signal line has two states (two values) High and Low. The control unit 90 of the power control device 10 sends a notification to the UPS 14 and obtains a state of the UPS 14 by setting a given signal line out of multiple signal lines to High (H) or Low (L) (see FIG. 9 described below).

A communication between the power control device 10 and the server PC 12 is performed by a UPS interface, and data input/output is performed in a serial manner. Consequently, the control unit 90 of the power control device 10 converts data input by USB to a change of state of the signal line that can be output by RS-232C, and converts the change of state of the signal line input by RS-232C to a data format which can be output by USB.

In the data reception process illustrated in FIG. 5, the control unit 90 converts serial data, which is input from the server PC 12 via USB, to H/L of one corresponding signal line out of RS-232C signal lines. When multiple data are input sequentially, the control unit 90 switches signal lines, which corresponds to respective data, to H/L sequentially. In the data transmission process illustrated in FIG. 6, when H/L of one of RS-232C signal lines is converted to serial data which can be output to the server PC 12 by USB. When the change of state occurs in signal lines sequentially, the control unit 90 transfers data indicating the change of H/L by USB in a serial manner. As a result, a state of the signal line becomes data including a state of the RS-232C signal line between the UPS 14 and the power control device 10 (High or Low of a specific pin) in a data part.

Figure 9:
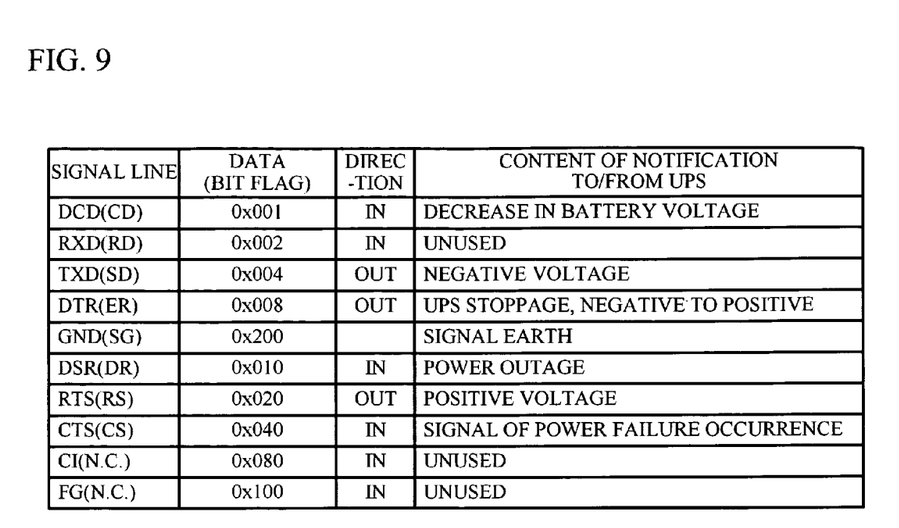
FIG. 9 is a diagram illustrating a correspondence relation between a signal line and serial data.

FIG. 9 is a diagram illustrating a correspondence relation between a signal line and data (a bit flag). As illustrated, signal lines (DCD(CD) through FG(N.C.)) correspond to data (0x001 through 0x100). According to this, information can be exchanged between the server PC 12 and the UPS 14 via the USB cable coupled between the server PC 12 and the power control device 10 and the RS-232C cable coupled between the power control device 10 and the UPS 14. That is to say that it becomes possible for the server PC 12 to obtain a state of the UPS 14 such as a decrease in battery voltage, power outage, power failure and the like, and to give a command such as a positive voltage, negative voltage, outage, and the like to the UPS 14.

According to the power control device 10 of the first embodiment, the control unit 90 determines the output destination of information input from the server PC 12 via the USB input/output control unit 70 (first input/output unit), and outputs information to one of the RS-232C input/output control unit 74 (second input/output unit), the RS-232C input/output control unit 78 (third input/output unit) and the storage unit 92 depending on the determination result. Accordingly, the server PC 12 can perform a setting change of the UPS 14, the serial device 18, and the power control device 10 via the power control device 10.

The control unit 90 adds information (a communication flag) indicating which of the RS-232C input/output control unit 74 (second input/output unit), the RS-232C input/output control unit 78 (third input/output unit) and the storage unit 92 is an input source of the information to the information output from the USB input/output control unit 70 (first input/output unit). The server PC 12 outputs information to given terminal control softwares 50 through 54 according to the communication flag. Accordingly, the server PC 12 can obtain information about the UPS 14, the serial device 18, and the power control device 10 via the power control device 10.

The control unit 90 has a function executing an interconversion between the change of state of the RS-232C signal line and a data format capable of communication by USB (FIGS. 8 and 9). Accordingly, information input/output via the USB input/output control unit 70 (first input/output unit) includes data indicating a change of state of the signal line (RS-232C) coupling the UPS 14 with the power control device 10. Consequently, even though the UPS 14 having only a serial port, which means the UPS does not have a USB port, is used, it is possible to change the setting and obtain information from the UPS 14 from the server PC 12.

As described above, intercommunication becomes possible by coupling the server PC 12, the UPS 14, and the serial device 18 each other via the power control device 10 and using common communication resource. According to this, a communication function of the power control device 10 can be improved, and it becomes unnecessary to set up a network environment and a serial console server separately. Consequently, cost reduction and space saving of the system become possible.

In the first embodiment, RS-232C is used for a communication interface between the power control device 10 and the UPS 14, and USB is used for a communication interface between the power control device 10 and the server PC 12, but interfaces applicable to the present server system are not limited to the above embodiment. For example, other serial interfaces having multiple signal lines can be used for a communication between the power control device 10 and the UPS 14 instead of RS-232C. Moreover, interfaces that can include a change of state of multiple signal lines between the power control device 10 and the UPS 14 in the communication data can be used for communication between the power control device 10 and the server PC 12 instead of the USB.

[Second Embodiment]

In a second embodiment, a description will be given of a case where a priority of a power supply source can be specified in a server system having a redundant configuration.

Figure 10:
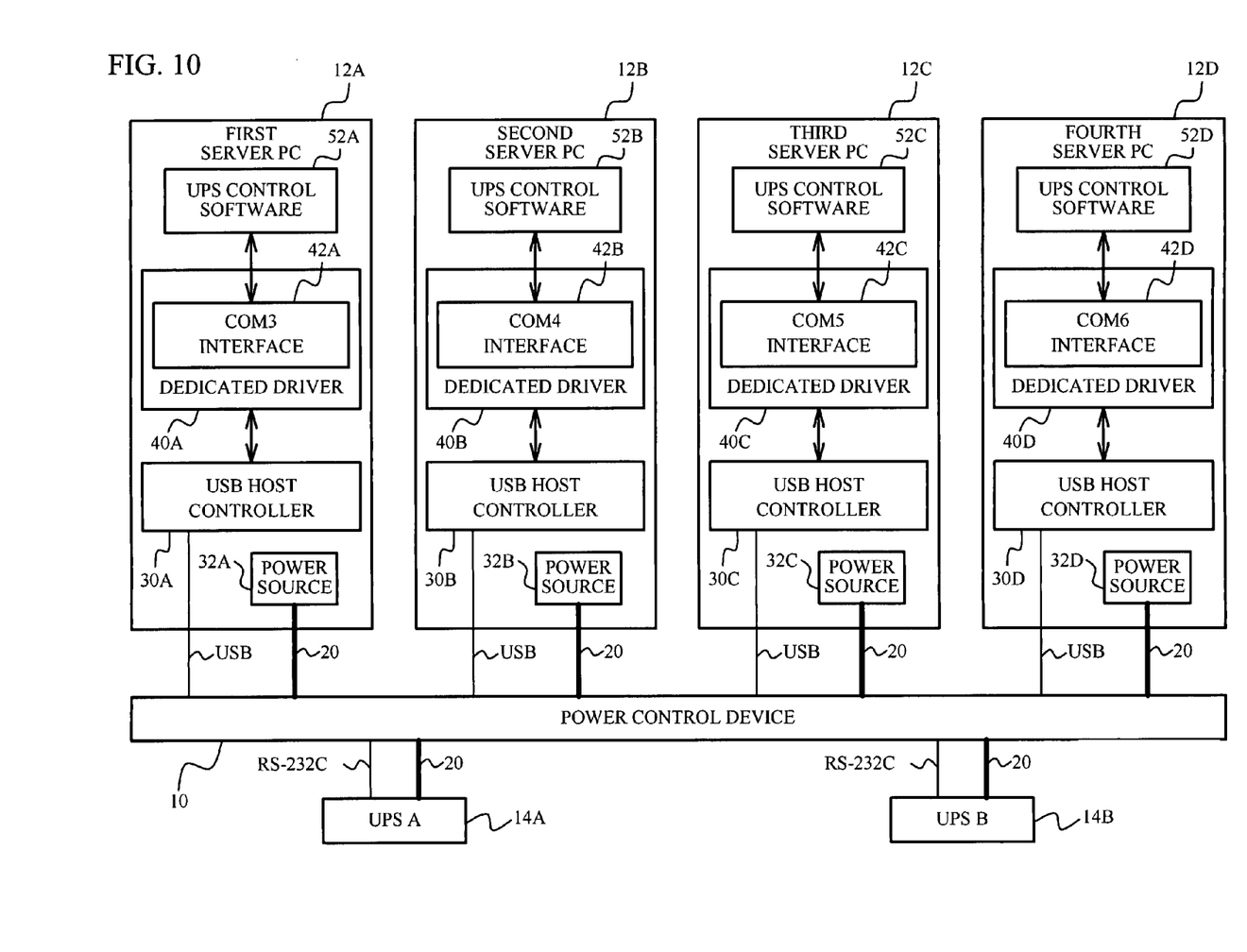
FIG. 10 is a diagram illustrating a composition of a server system in accordance with a second embodiment.

FIG. 10 is a diagram illustrating a composition of a server system in accordance with a second embodiment. Four server PCs 12A through 12C (first server PC 1 through fourth server PC) are coupled to the power control device 10. Each server PC includes dedicated drivers 40A through 40B, and different interfaces 42A through 42D (COM3 through COM6) are installed to each dedicated driver. Moreover, the second embodiment is different from the first embodiment in that two UPSs 14A and 14B (first UPS and second UPS) are coupled to the power control device 10. Other compositions are same as those of the first embodiment, and a detail description is omitted.

Figure 11:
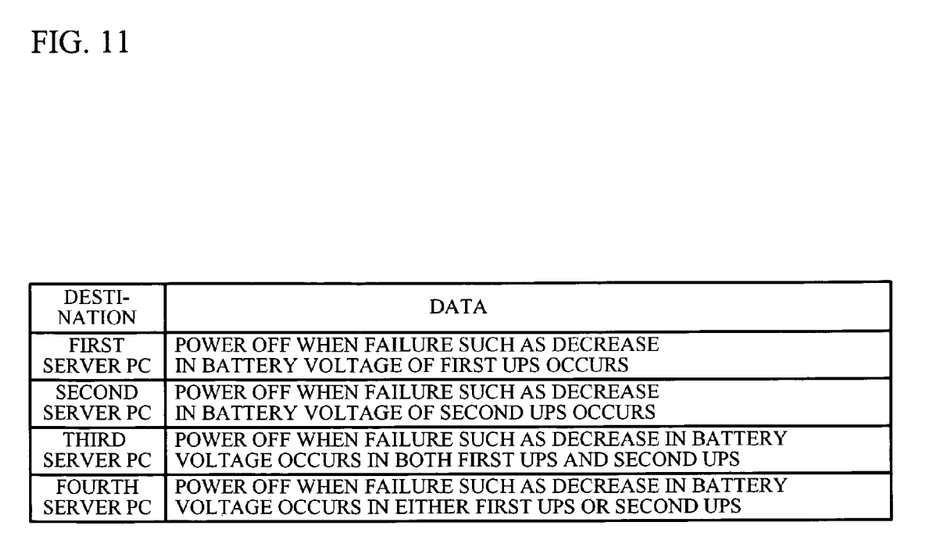
FIG. 11 is a diagram illustrating a power-off condition of each server.

As illustrated in FIG. 11, power-off conditions according to priorities are preliminarily set to four server PCs 12A through 12D. Here, the power-off condition of the third server PC is most stringent (a priority of power supply is high) and the power-off condition of the fourth server PC is mildest (a priority of power supply is low). Power-off conditions other than conditions illustrated in the drawing can be set arbitrarily.

Figure 12:
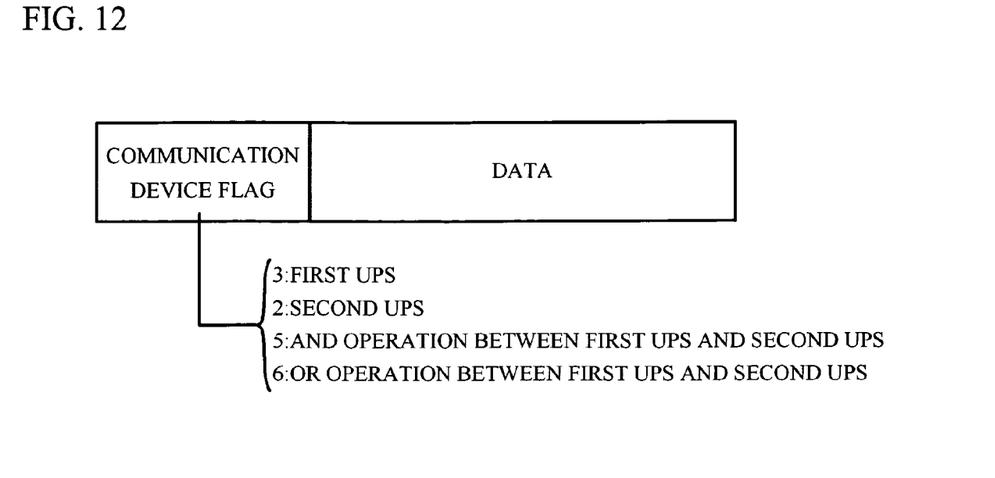
FIG. 12 is a diagram illustrating a format of data in the second embodiment.

FIG. 12 is a diagram illustrating a format of data transmitted/received between server PCs and the power control device 10 by the USB interface. In the same manner as the first embodiment (FIG. 4), a communication flag indicating a device for data communication is set to a data header. Communication flags "3" and "4" indicate the first. UPS 14A and the second UPS 14B respectively. Moreover, "5" indicates a result of AND operation between the first UPS 14A and the second UPS 14B, and "6" indicates a result of OR operation between the first UPS 14A and the second UPS 14B. According to this, power-off conditions set to the third server PC and the fourth server PC in FIG. 11 can be reflected to the flags. These flags are set by the control unit 90 of the power control device 10 or the like.

Figure 13:
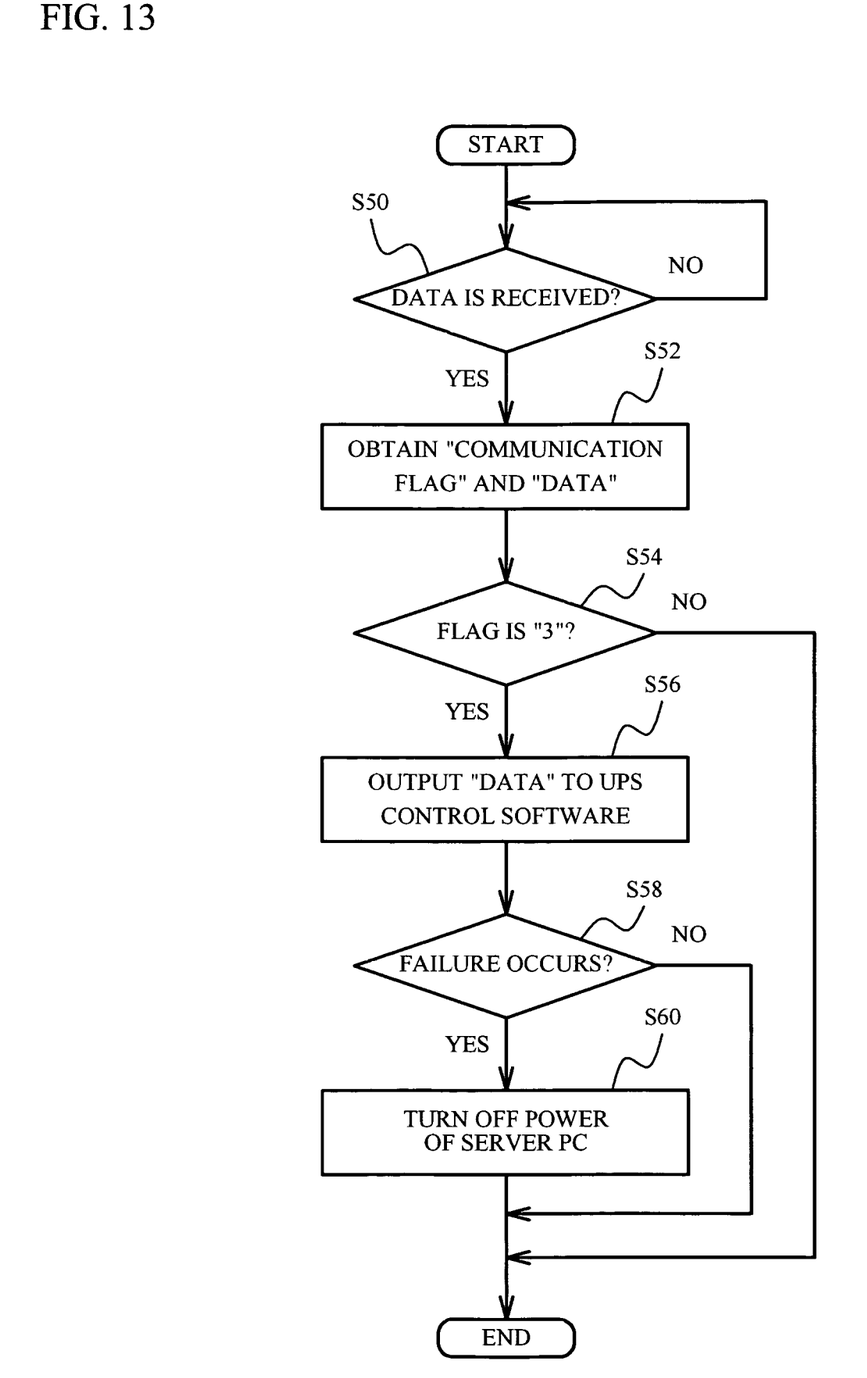
FIG. 13 is a diagram illustrating a data processing in the second embodiment.

FIG. 13 is a diagram illustrating a data processing in accordance with the second embodiment. A description is given of a process in a case where data is output to the first server PC 12A from the power control device 10. The dedicated driver 40A of the server PC 12A determines whether data is received from the power control device 10 (step S50). When data is received, the dedicated driver 40A obtains a "communication flag" and "data" from received data (step S52). When the "communication flag" is "3" (step S54), the dedicated driver 40A outputs "data" to a UPS control software 52A via the COM3 interface 42A (step S56). When the "communication flag" is anything other than "3", the dedicated driver 40A does not output data to the UPS control software 52A.

When the "communication flag" of data is "3", the UPS control software 52A determines whether a failure occurs in the first UPS 14A (step S58). When the failure occurs in the first UPS 14A, the UPS control software 52A turns off the power of the server PC 12A (step S60). Same process is executed to other server PCs 12B through 12D in a same manner as the first server PC 12A.

Figure 14:
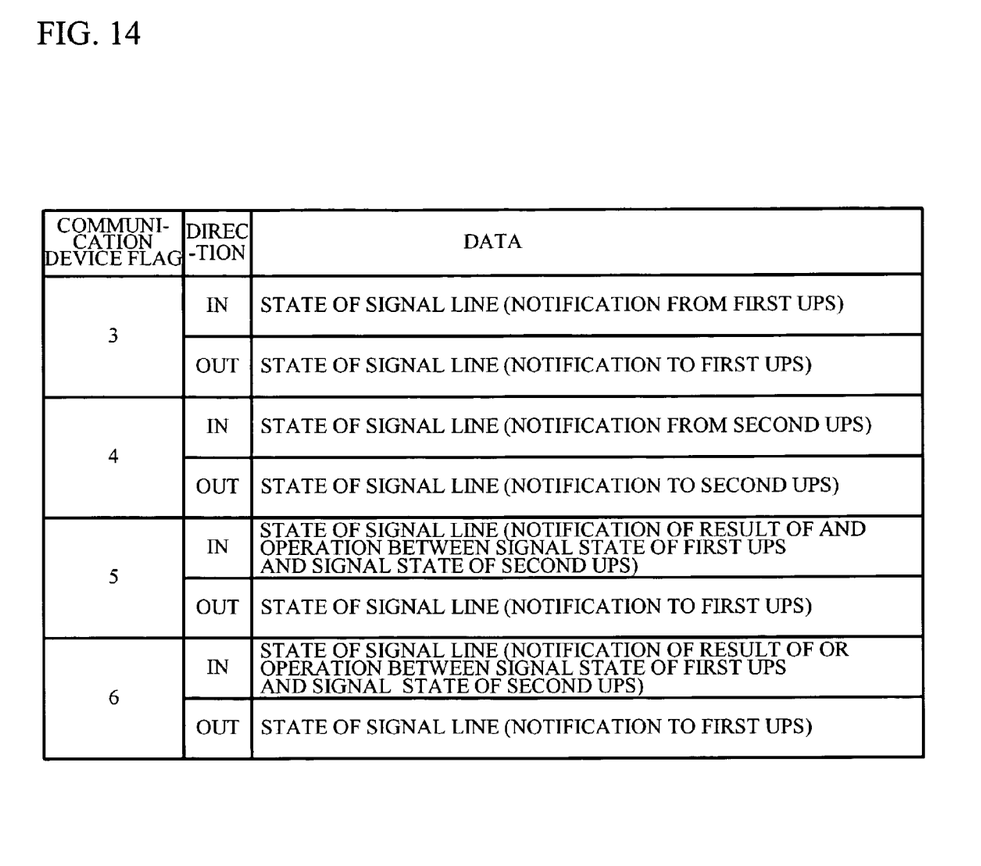
FIG. 14 is a diagram illustrating a specific structure of data in the second embodiment.

FIG. 14 is a diagram illustrating a specific structure of data. In addition to the format in FIG. 12, input/output direction of data is provided. The direction of data "OUT" means a data reception process from the server PC 12 in the power control device 10. The direction of data "IN" means a data transmission process to the server PC 12 from the power control device 10 (FIG. 13). As different from the first embodiment, all of the contents of data is a state of the signal line, and reflects power-off conditions set in FIG. 11.

According to the server system of the second embodiment, the control unit 90 of the power control device 10 detects state of the first UPS 14A and the second UPS 14B, adds flags depending on power-off conditions preliminarily set to results of AND operation and OR operation between them to data, and outputs data to server PCs 12A through 12D. The server PCs 12A through 12D judge communication flags in dedicated drivers 40A through 40D, and output only data that meets their own power-off conditions to internal UPS control softwares 52A through 50D. According to this, power-off conditions depending on priorities can be easily set to server PCs 12A through 12D, and only the server PC of which the priority is higher can receive a power supply in emergency situations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A power control device coupled to a power supply device and an information processing device, and configured to control a power supply from the power supply device to the information processing device, the power control device comprising:
    a first input/output unit configured to input/output data from/to the information processing device;
    a second input/output unit configured to input/output data from/to the power supply device by a change of state of signal lines;
    a storage unit configured to store data input from the first input/output unit and the second input/output unit; and
    a control unit configured to execute a conversion process for converting data input from the first input/output unit to a change of state of a signal line that can be output from the second input/output unit, and converting a change of state of a signal line input from the second input/output unit to a data format that can be output from the first input/output unit,
    wherein the control unit determines an output destination of input data input from the first input/output unit, outputs the input data to the second input/output unit or the storage unit depending on a determination result, and adds a flag to output data output from the first input/output unit, the flag indicating which of the second input/output unit and the storage unit is an output source of the output data.

2. The power control device according to claim 1, wherein a communication interface of the first input/output unit is USB, and a communication interface of the second input/output unit is RS-232C.

3. The power control device according to claim 1, further comprising
    a third input/output unit configured to input/output serial data from/to a device including a serial port,
    wherein the control unit converts data input from the first input/output unit to serial data that can be output from the third input/output unit, and converts serial data input from the third input/output unit to the data format that can be output from the first input/output unit.

4. The power control device according to claim 1, wherein the power control device is coupled to power supply devices and information processing devices, and
    the control unit detects a state of each of power supply devices, creates detection results based on power-off conditions preliminarily set to information processing devices, and notifies information processing devices of the detection results.

5. The power control device according to claim 1,
    wherein the conversion process is for converting the data input from the first input/output unit to High or Low of a corresponding signal line out of the signal lines, and converting High or Low of the corresponding signal line out of the signal lines to the data format that can be output from the first input/output unit.

6. A power control device coupled to a power supply device and an information processing device, and configured to control a power supply from the power supply device to the information processing device, the power control device comprising:
    a first input/output unit configured to input/output data from/to the information processing device;
    a second input/output unit configured to input/output data from/to the power supply device by a change of state of signal lines;
    a storage unit configured to store data input from the first input/output unit and the second input/output unit;
    a control unit configured to execute a conversion process for converting data input from the first input/output unit to a change of state of a signal line that can be output from the second input/output unit, and converting a change of state of a signal line input from the second input/output unit to a data format that can be output from the first input/output unit; and a third input/output unit configured to input/output serial data from/to a device including a serial port, wherein the control unit converts data input from the first input/output unit to serial data that can be output from the third input/output unit, and converts serial data input from the third input/output unit to the data format that can be output from the first input/output unit, and wherein the control unit determines an output destination of input data input from the first input/output unit, outputs the input data to one of the second input/output unit, the third input/output unit and the storage unit depending on a determination result, and adds a flag to output data output from the first input/output unit, the flag indicating which of the second input/output unit, the third input/output unit, and the storage unit is an output source of the output data.

7. The power control device according to claim 4, wherein the detection results include at least one of a detection result of a state of each of the power supply devices, a result of AND operation between the power supply devices, and a result of OR operation between the power supply devices.

8. The power control device according to claim 4, wherein the power control device is coupled to the power supply devices by RS-232C cable and the power control device is coupled to the information processing devices by USB cable.

* * * * *